(12) United States Patent
Tenca (10) Patent No.: US 9,537,311 B2
(45) Date of Patent: Jan. 3, 2017

(54) SUBSEA POWER TRANSMISSION

(71) Applicant: GENERAL ELECTRIC COMPANY, Schenectady, NY (US)

(72) Inventor: Pierluigi Tenca, Munich (DE)

(73) Assignee: General Electric Company, Niskayuna, NY (US)

( * ) Notice: Subject to any disclaimer, the term of this patent is extended or adjusted under 35 U.S.C. 154(b) by 419 days.

(21) Appl. No.: 14/286,350

(22) Filed: May 23, 2014

(65) Prior Publication Data

US 2015/0340860 A1 Nov. 26, 2015

(51) Int. Cl.
| | |
|---|---|
| *H02J 1/08* | (2006.01) |
| *H02M 3/335* | (2006.01) |
| *H02J 3/36* | (2006.01) |
| *H02J 1/00* | (2006.01) |

(52) U.S. Cl.
CPC .. *H02J 1/08* (2013.01); *H02J 3/36* (2013.01); *H02M 3/33576* (2013.01); *H02J 2001/002* (2013.01); *Y02E 60/60* (2013.01); *Y10T 307/406* (2015.04)

(58) Field of Classification Search
CPC ....................................................... H02J 1/102
USPC ........................................................... 307/82
See application file for complete search history.

(56) References Cited

U.S. PATENT DOCUMENTS

| | | | |
|---|---|---|---|
| 7,851,943 B2 | 12/2010 | Datta et al. | |
| 7,880,419 B2 | 2/2011 | Sihler et al. | |
| 8,212,408 B2 | 7/2012 | Fishman | |
| 8,373,307 B2 | 2/2013 | Sihler et al. | |
| 8,624,431 B2 | 1/2014 | Kanakasabai et al. | |
| 2003/0099120 A1 | 5/2003 | Yu | |
| 2010/0133901 A1 | 6/2010 | Zhang et al. | |
| 2012/0161518 A1 | 6/2012 | Schroeder et al. | |
| 2012/0175962 A1 | 7/2012 | Zhan et al. | |
| 2013/0181532 A1 | 7/2013 | Kjaer | |
| 2013/0241368 A1 | 9/2013 | Liu et al. | |

FOREIGN PATENT DOCUMENTS

| | | |
|---|---|---|
| EP | 1385259 A2 | 1/2004 |
| EP | 2228897 A1 | 9/2010 |
| EP | 2372862 A2 | 10/2011 |

(Continued)

OTHER PUBLICATIONS

M. Grotzbach et al., "Harmonics Study of a CSI-fed Subsea Cable Transmission", Harmonics and Quality of Power, Ninth International Conference, vol. 3, Oct. 1-4, 2000, pp. 948-954.

(Continued)

*Primary Examiner* — Robert Deberadinis
(74) *Attorney, Agent, or Firm* — Nitin N. Joshi (57) ABSTRACT

A power transmission and distribution system includes a supplying side having a current source and a receiving side. The receiving side includes a modular converter with plurality of direct current (DC)-alternating current (AC) current source converters connected in series with the current source and a plurality of AC-DC rectifiers connected in parallel to supply power to a multiplicity of loads. Each of the DC-AC current source converters supply power to a corresponding AC-DC rectifier and includes a plurality of reverse blocking fully controllable switches having bidirectional voltage blocking capability. Furthermore, a current from the current source flows in at least one reverse blocking fully controllable switch at any instant.

21 Claims, 5 Drawing Sheets

(56) References Cited

FOREIGN PATENT DOCUMENTS

WO      2014037583 A2    3/2014

OTHER PUBLICATIONS

G. Mondal et al., "Design and Simulation of a Modular Multi-Level Converter for MVDC Application", Industrial Electronics (ISIE), 2011 IEEE International Symposium, Jun. 2011, pp. 200-205.

R. Lai, "Deep Water Electrical Power Distribution System and Power Components", RPSEA Phase 2 Final Report: MSDC Electrical System for Deepwater Subsea Process, pp. 1-30, Nov. 19, 2013.

J. Song-Manguelle et al., "A Modular Stacked DC transmission and distribution system for long distance subsea applications," IEEE Energy Conversion Congress and Exposition, Sep. 15-20, 2012, pp. 4437-4444.

S. Demmig et al., "Control of Subsea Motors on Multi-KM Cable Lengths by Variable Frequency Drives," Published in: Petroleum and Chemical Industry Conference Europe Conference Proceedings (PCIC Europe), Jun. 7-9, 2011.

T. Hazel et al., "Subsea High-Voltage Power Distribution," 2011 Record of Conference Papers Industry Applications Society 58th Annual IEEE, Sep. 19-21, 2011, pp. 1-9.

J. Liang et al., "Current Source Modular Multilevel Converter for HVDC and FACTS," 2013 15th European Conference, Sep. 2-6, pp. 1-10.

Monjean et al., "Topologies Comparison of Multi-Cell Medium Frequency Transformer for Offshore Farms", AC and DC Power Transmission, 2010. ACDC. 9th IET International Conference, London, pp. 1-5, Jan. 1, 2010.

European Search Report and Opinion issued in connection with corresponding EP Application No. 15168527.8 on Oct. 8, 2015.

SUBSEA POWER TRANSMISSION

BACKGROUND

The invention relates generally to power transmission and more specifically to a system and method for transmitting electrical power to sub-sea electrical equipment.

Sub-sea electrical equipment such as a sub-sea motor which drives a gas compressor has a higher nominal power rating (e. g., in the order of 10 or 15 MW). As such, sub-sea compression clusters may be required to transmit a total power in the order of 50 to 100 MW over a distance of 100 or 200 km. The transmission of high power over a distance of more than 100 km and distributing the power sub-sea is a very challenging problem. Such a transmission is done at high voltages to reduce losses. At the receiving sub-sea end, the voltage is stepped-down and then distributed to the individual loads. Distribution distances are typically much shorter than the transmission distance.

Three phase alternating current (AC) power transmission and distribution is one way of transmitting power to subsea equipment. AC power transmission, although mature, provides technical challenges for applications where bulk power is transmitted over long cables. Due to cable capacitance, a significant amount of reactive power needs to be provided by the power source and carried by the cable. Capacitance causes charging current to flow along the length of the AC cable. Because the cable must carry this charging current in addition to the useful load current, the cable losses are high; the cables are over-rated and expensive. Large reactive power requirements may trigger power system stability issues.

The limitation of AC transmission and distribution can be alleviated by direct current (DC) transmission. High voltage (HV) DC transmission typically requires the usage of power electronic converters in the transmission systems that are capable of converting between HVAC and HVDC. Line commutated converters (LCC) and voltage sourced converters (VSC) are examples of such power electronic converters. However, LCC converters require significant amount of filters to supply for desired reactive power whereas VSC converters require large DC capacitors which affects reliability and maintenance.

Therefore, there still exists a need for a compact and a reliable system and method for transmitting electric power to subsea equipment.

BRIEF DESCRIPTION

In accordance with an embodiment of the present technique, a power transmission and distribution system is provided. The system includes a supplying side having a current source and a receiving side. The receiving side includes a modular converter having a plurality of direct current (DC)-alternating current (AC) current source converters connected in series with the current source and a plurality of AC-DC rectifiers connected in parallel to supply power to a multiplicity of loads, wherein each of the DC-AC current source converters supply power to a corresponding AC-DC rectifier. Each of the DC-AC current source converters include a plurality of reverse blocking fully controllable switches having bidirectional voltage blocking capability. Furthermore, a current from the current source flows in at least one reverse blocking fully controllable switch at any instant.

In accordance with another embodiment of the present technique, a method of transmitting power to a subsea load is provided. The method includes providing a plurality of reverse blocking fully controllable switches having bidirectional voltage blocking capability to form each of a plurality of direct current (DC)-alternating current (AC) current source converters. The method further includes connecting the plurality of DC-AC current source converters in series with a supply side current source and supplying AC power to a plurality of AC-DC rectifiers from the plurality of DC-AC current source converters, wherein supplying AC power includes coupling each of the DC-AC current source converters to a corresponding AC-DC rectifier; wherein a current from the supply side current source flows in at least one reverse blocking fully controllable switch at any instant. The method also includes coupling the plurality of AC-DC rectifiers in parallel to supply power to the subsea load.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be appreciated by those skilled in the art, the term "current source" refers to an apparatus capable of measuring the current flowing in at least one of its terminals at discrete time instants and capable of controlling at least one total time derivative of at least one current in at least one of its terminals at discrete time instants. The control of said at least one total time derivative of at least one current in at least one of its terminals can be achieved by controlling at least one voltage across at least two points of said apparatus.

Figure 1:
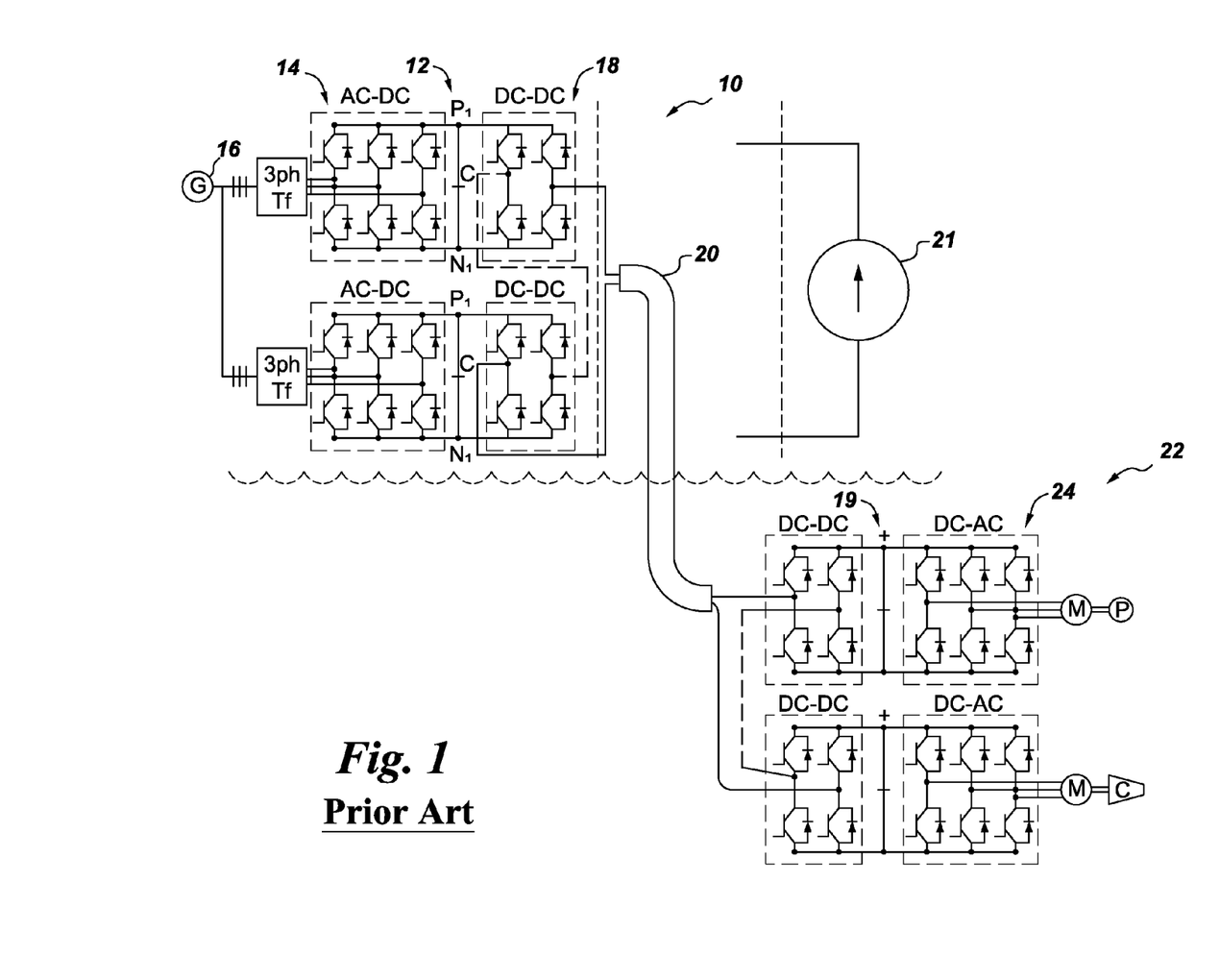
FIG. 1 is a schematic diagram illustrating a prior art sub-sea power transmission/distribution system with modular stacked power converters.

Turning now to the drawings, by way of example in FIG. 1, a schematic diagram 10 illustrating a prior art sub-sea power transmission/distribution system with modular stacked power converters is depicted. In general, modular stacked DC converter (MSDC) architectures are well suited for sub-sea applications requiring transmission and distribution over long distances. Unlike other DC transmission options, wherein the DC transmission (link) voltage is controlled, i.e. maintained nearly constant, the DC transmission (link) current is controlled in a modular stacked dc converter. System 10 depicts one such MSDC architecture. The MSDC architecture gets its name from the fact that the architecture uses several dc-dc/ac-dc/dc-ac converter modules stacked and connected in series on the dc side. In the embodiment shown in FIG. 1, both at the sending end and at the receiving end of the transmission link the converter modules are connected in series. However, in the present technique which will be illustrated in subsequent paragraphs, this requirement of having modular stacked DC converters on both the sending end and the receiving end is not necessary although possible. In other words, in the present technique, a source side converter can be different in structure from the converter in the subsea section.

The system 10 includes sending end/on-shore side converters 12 comprising a set of AC-DC converters 14, which draw power from the AC mains or grid 16. Each of these converters 14 is cascaded with a DC-DC converter 18. These DC-DC converters 18 are connected in series and they are controlled so as to regulate a current in a DC cable 20 connecting the on-shore converters 12 to the sub-sea installation 22. It shall be understood that the sending-end AC-DC 14 and DC-DC converter 18 stages (shown explicitly in FIG. 1) can be replaced by a single AC-DC converter that combines the functions of both the stages. In other words, on-shore converter 12 may be any combination of converters that regulates the current in the DC cable 20 and thus, converter 12 may also be represented as a current source 21. The sub-sea/receiving-end side converter 22 also comprises several DC-DC converters 19 connected in series. Each of these converters 19 is cascaded with a DC-AC inverter/motor drive 24. These DC-DC converters 19 are controlled to regulate the DC link voltage to that required by the down-stream motor drive 24. It shall also be understood that the subsea DC-DC converter 19 and motor drive 24 can also be replaced by a single DC-AC converter that combines the functions of both the stages. Although FIG. 1 depicts two-level converters used for the AC-DC, DC-DC and motor drive modules, it shall be understood that at high power levels, multi-level stacks will be used for these converter modules.

Figure 2:
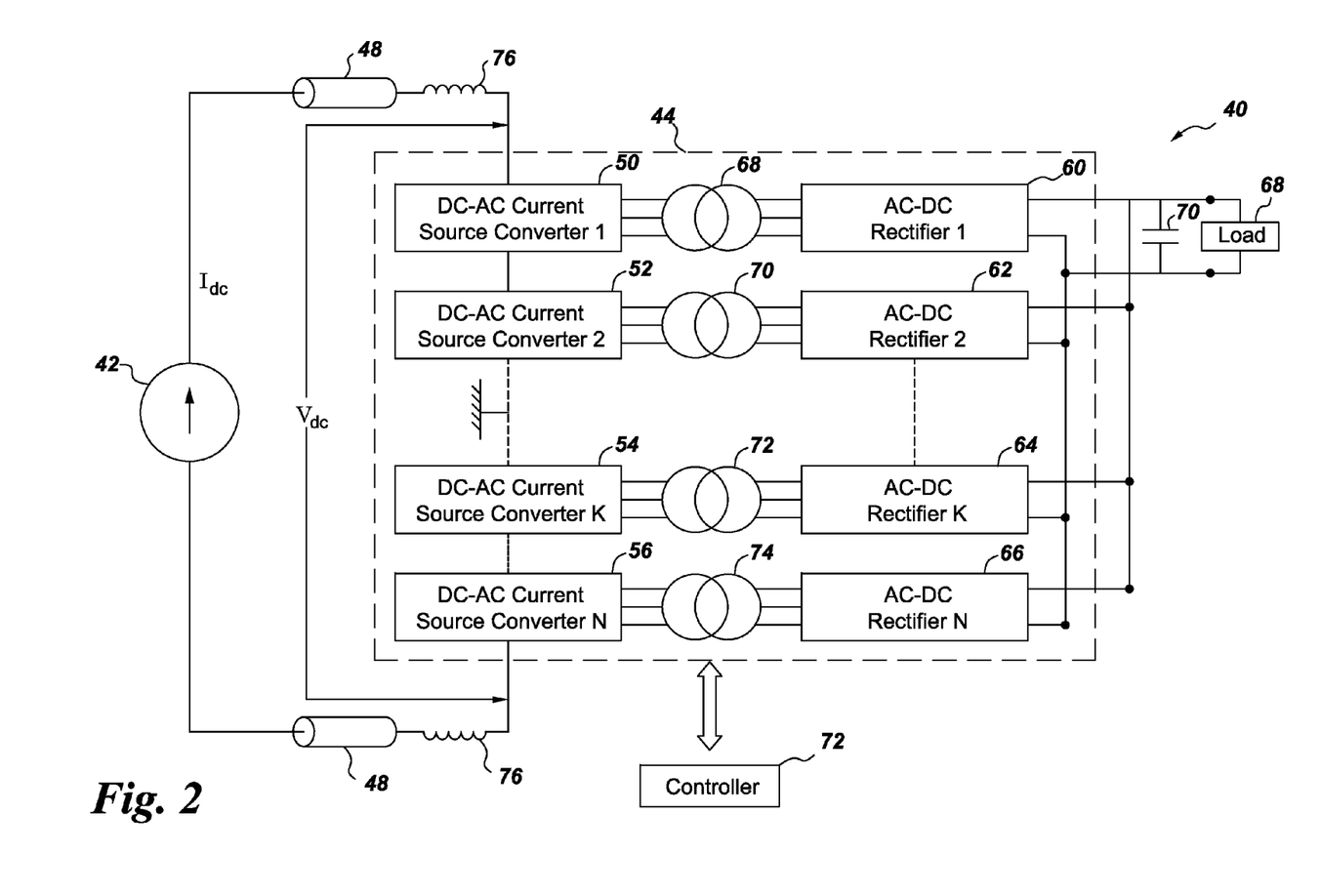
FIG. 2 is a schematic diagram illustrating a sub-sea power transmission/distribution system with modular current source converters in accordance with an embodiment of the present technique.

Referring now to FIG. 2, a schematic diagram illustrating a sub-sea power transmission/distribution system 40 with modular current source converters in accordance with an embodiment of the present technique is depicted. System 40 includes a source side/on-shore current source 42 which supplies power to load side or subsea side converter system 44 via cables 46, 48. In one embodiment, on-shore current source 42 may be connected to subsea side converter system 44 via cables 46, 48 and inductors 74, 76 respectively. It should be noted that inductors 74, 76 are not always necessary and they may be omitted by proper cable parameters such as inductance and capacitance (not shown) of cables 46, 48 and/or sufficiently high switching frequency of converters. Furthermore, on-shore current source 42 may be any power source which keeps a current in cable 46, 48 controlled to follow a desired reference function of time. In one embodiment, such a function of time can be a constant. As described with respect to FIG. 1, in one embodiment, current source 42 may be an AC-DC converter followed by a DC-DC converter.

Subsea side converter system 44 may include a plurality of DC-AC current source converters 50, 52, 54, 56 connected in series on input side with on-shore current source 42. In other words, an input DC link voltage Vdc is divided across the plurality of current source converters 50, 52, 54, 56. It should be noted that the term "DC-AC current source converter" refers to a converter which receives an input current which evolves in time according to a desired function. In one embodiment, the desired function can be a constant. Furthermore, such a function cannot have discontinuities of any kind. Furthermore, each of DC-AC current source converters 50, 52, 54, 56 includes a plurality of fully controllable switches having bidirectional voltage blocking capability. It should also be noted that at least one of the DC-AC current source converters 50, 52, 54, 56 does not possess an electrical network, comprising only a plurality of capacitors, directly connected between its two DC terminals only like some conventional voltage source embodiments. However, the present embodiment may include an electrical network comprising a plurality of capacitors and other electrical elements such as resistors connected between its two DC terminals. More details of DC-AC current source converter would be discussed in subsequent paragraphs.

Each of the DC-AC current source converters 50, 52, 54, 56 is coupled to at least one AC-DC rectifier 60, 62, 64 and 66 respectively as shown in FIG. 2. In one embodiment, each of the AC-DC rectifiers 60, 62, 64 and 66 may be coupled to each of the DC-AC current source converters 50, 52, 54, 56 via at least one transformer 68, 70, 72 and 74 respectively. AC-DC rectifiers 60, 62, 64 and 66 may include AC-DC active rectifiers or AC-DC passive rectifiers. The AC-DC passive rectifier includes uncontrolled switches such as diodes whereas the AC-DC active rectifier includes at least one fully controllable switch.

In one embodiment, all AC-DC rectifiers 60, 62, 64 and 66 are connected in parallel on output side and a plurality of loads 68 are supplied by these rectifiers. The plurality of loads 68 may include a motor drive, a power converter for pumps and other subsea equipment power converters. In one embodiment, a capacitor 70 may be connected across output terminals of parallel connected rectifiers 60, 62, 64 and 66 as shown in FIG. 2. A controller 72 may control the operation of sub-sea power transmission/distribution system 40 including the plurality of AC-DC current source converters and DC-AC rectifiers. It should be noted that the DC-AC current source converters, the transformers and the AC-DC rectifiers are all multiphase components, i.e., they may be three phase components or single phase components as per the requirement.

Figure 3:
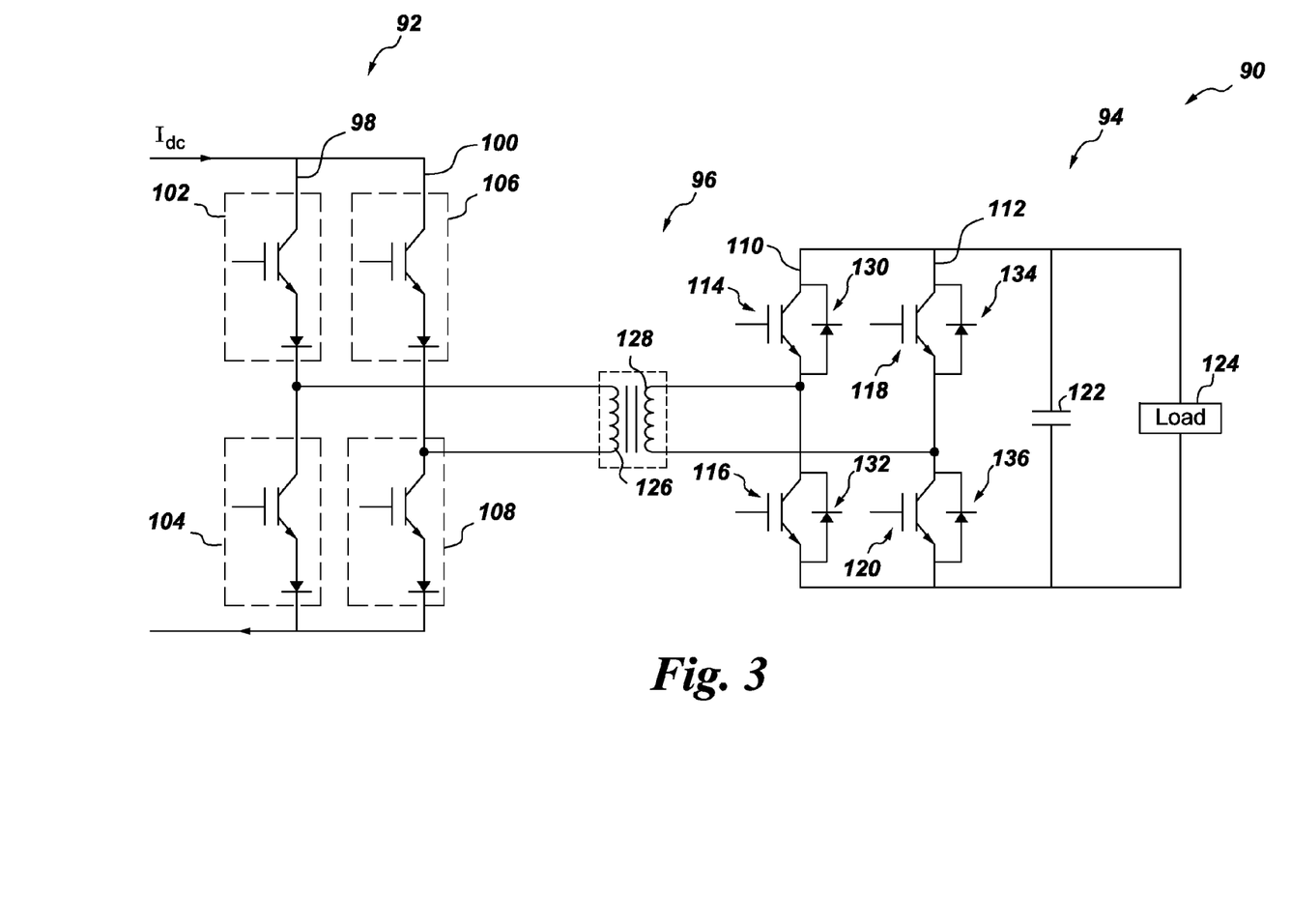
FIG. 3 is a schematic diagram illustrating a detailed section of the sub-sea power transmission/distribution system of FIG. 2 in accordance with an embodiment of the present technique.

Referring now to FIG. 3, a schematic diagram illustrating a detailed section 90 of the sub-sea power transmission/distribution system 40 of FIG. 2 in accordance with an embodiment of the present technique is depicted. In the section 90 shown in FIG. 3, a DC-AC current source converter 92 is coupled to an AC-DC rectifier 94 via a transformer 96. As discussed earlier with respect to FIG. 2, a plurality of such DC-AC current source converters are connected in series on input side and a plurality of AC-DC rectifiers are connected in parallel on output side in the overall power transmission/distribution system 40.

DC-AC current source converter 92 receives a current Idc as input and provides alternating positive and negative current pulses (±Idc) as output which is supplied to transformer 96. Transformer 96 then generates an AC voltage at its output terminals which is supplied as input to AC-DC rectifier 94. In the embodiment shown, DC-AC current source converter 92 includes 2 legs 98, 100 each comprising two reverse blocking fully controllable switches 102, 104 and 106, 108 respectively. Each of the fully controllable switches 102, 104, 106, 108 has bidirectional voltage blocking capability, i.e., these switches can block voltage of both polarities, when applied across their two terminals. Examples of reverse blocking full controllable switches 102, 104, 106, 108 include conventional insulated gate bipolar transistors (IGBTs) in series with diodes, reverse blocking insulated gate bipolar transistors (IGBTs), and reverse blocking integrated gate commutated thyristor (IGCTs). Furthermore, fully controllable switches 102, 104, 106, 108 may include wide band-gap devices like, for example, those based on Silicon Carbide material. It should be noted that "fully controllable switch" refers to a switch which can be switched ON and OFF by at least one control terminal e.g., IGBT is a fully controllable switch, however, the conventional thyristor is not. It should be further noted that at least one of the fully controllable switches can be composed by a multiplicity of elementary switches, which are properly grouped via series and/or parallel connections among them in order to reach the voltage and current ratings necessary for the composed switch.

AC-DC rectifier 94 converts AC input voltage/power into DC voltage/power. In the embodiment shown, AC-DC rectifier 94 includes two legs 110, 112, each comprising two fully controllable switches 114, 116 and 118, 120 respectively. Furthermore, each of the fully controllable switches 114, 116, 118, 120 is connected in parallel with a diode 130, 132, 134, 136 respectively. In one embodiment, the rating of switches 114, 116, 118, 120 is low compared to diodes 130, 132, 134, 136 because in that case the switches conduct only for short duration compared to the diodes. A capacitor 122 and a load 124 are connected to output side of the AC-DC rectifier 94. Furthermore, it should be noted that in other embodiments, a passive rectifier (e.g., a diode bridge) may be used in place of AC-DC rectifier 94 of FIG. 3. In such a case, a small rating active rectifier may be used on a tertiary winding of transformer 96 as shown in FIG. 4.

During the operation, when the input current Idc is substantially constant, at least one of the fully controllable reverse blocking switch 102, 104, 106, 108 should be conducting at any given time and thus, current from the current source flows in at least one reverse blocking fully controllable switch at any instant. Furthermore, in one embodiment, there will be more than one single phase DC-AC current source converters and thus, the current then may need to be flowing in at least six reverse blocking fully controllable switches at any instant. Commonly, but not exclusively, DC-AC current source converter 92 is simply operated in a square wave operation, with pairs of switching devices not belonging to the same leg, and not connected to the same common point, commanded almost simultaneously. Furthermore, when switches 102 and 108 are ON, a transformer current would flow from top to bottom (i.e., a forward direction) whereas when switches 104 and 106 are ON, the transformer current would flow from bottom to top (i.e., a reverse direction). The current direction reversal from the forward direction to the reverse direction would be achieved by short circuiting a primary winding 126 of the transformer 96. This is achieved by simultaneously switching ON devices 102, 106, or devices 104, 108 or all devices 102, 104, 106, and 108. The short circuit duration is terminated when the current has reversed completely (e.g., Idc to −Idc). In one embodiment, a snubber circuit (not shown) may also be used to carry the current for a transient duration where there may be some measurement or timing errors in switching ON or OFF the switching devices exactly at the same instance as end of short circuit duration. Furthermore, during the time intervals when the winding 126 is short circuited, and there is a non-zero current in the two terminals of the DC-AC converter, the leakage inductance of the transformer winding limits the short circuit current and thus, the short circuit current can be reversed in a controlled manner. This controlled current reversal prepares the current in each winding with the sign and magnitude suitable for the reconnection to the loop performed by the next pair of switches.

The short circuiting of transformer windings results in trapezoidal currents in the transformer winding and hence better utilization of transformer material such as transformer core material. In general, when devices 114 and 120 are switched ON, AC-DC rectifier 94 outputs a transformer secondary winding voltage whereas when devices 116 and 118 are switched ON, AC-DC rectifier 94 outputs a reverse polarity transformer secondary winding voltage. The current in the short circuited winding 126 can be reversed in a controlled manner via the voltage provided by the active rectifier 94 only.

Figure 4:
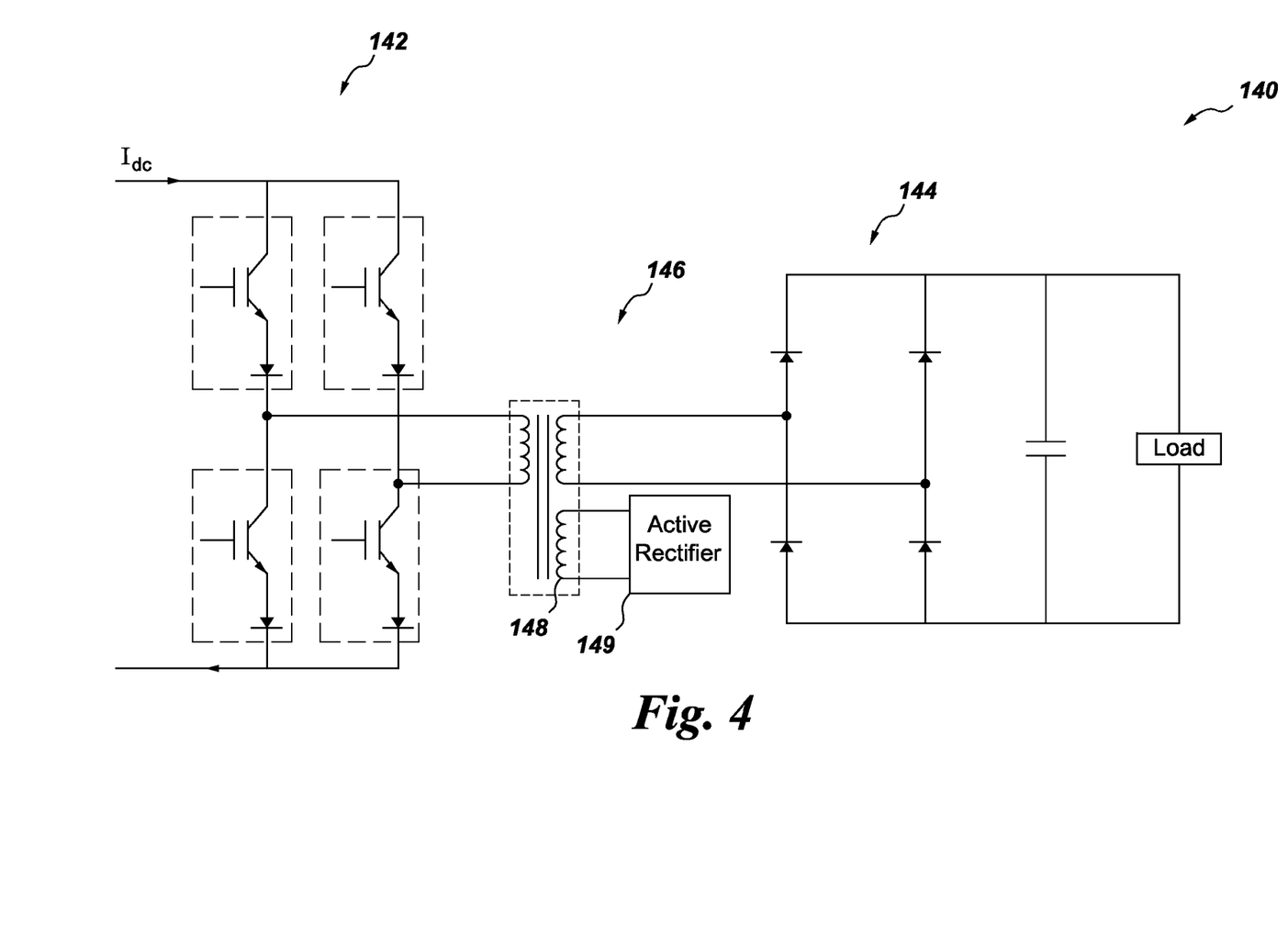
FIG. 4 is a schematic diagram illustrating a detailed section of the sub-sea power transmission/distribution system of FIG. 2 in accordance with another embodiment of the present technique.

Referring now to FIG. 4, a schematic diagram illustrating a detailed section 140 of the sub-sea power transmission/distribution system 40 of FIG. 2 in accordance with another embodiment of the present technique is depicted. In the section 140 shown in FIG. 4, a DC-AC current source converter 142 is coupled to an AC-DC rectifier 144 via a transformer 146. As discussed earlier with respect to FIG. 2, a plurality of such DC-AC current source converters are connected in series on input side and a plurality of AC-DC rectifiers are connected in parallel on output side in the overall power transmission/distribution system 40.

It should be noted that section 140 is similar to section 90 of FIG. 3 with some differences. In section 140, as compared to section 90, a tertiary winding 148 is provided on transformer 146 which is connected to an active rectifier 149. Furthermore, AC-DC rectifier 144 is a passive rectifier e.g., a diode bridge rectifier. During the short circuit period of transformer winding, the current in the primary winding can be reversed in a controlled manner via the voltage provided by the combination of a passive rectifier 144 and active rectifier 149 connected to a tertiary winding of the transformer. It should be noted that this embodiment allows a different voltage rating for active rectifier 149 and passive rectifier 144, thereby leading to design optimization. Furthermore, as discussed earlier, active rectifier 140 may include at least one fully controllable switch.

Referring back to FIG. 2, when some DC-AC current source converters fail and must be excluded from the system then input DC link voltage Vdc can be slowly adapted to a new number of DC-AC current source converters before reconnection of the reconfigured system. The construction technology of some suitable switching devices (e.g. press-pack packages) permits that when they fail they inherently provide a fast by-pass facility lasting at least some seconds. Because of the current source nature of the system the short-circuited failed devices are not subject to very high current peaks, like it happens in voltage-source converters with all difficulties that this implies. Furthermore, in the present technique, the fault is much less abrupt and much better tolerated by the devices, hence ultimately by the system, which can also be reconfigured over a much longer comfortable time. This inherent robust fast by-pass action without the need of additional arrangements that are needed in other voltage source solutions to avoid the short circuit of the large DC-link capacitors is an advantage of the present technique. Furthermore, after few seconds of transient a slow mechanical moving contact can be activated to guarantee a very reliable long term by-pass action without relying on and stressing anymore the failed switching devices.

Figure 5:
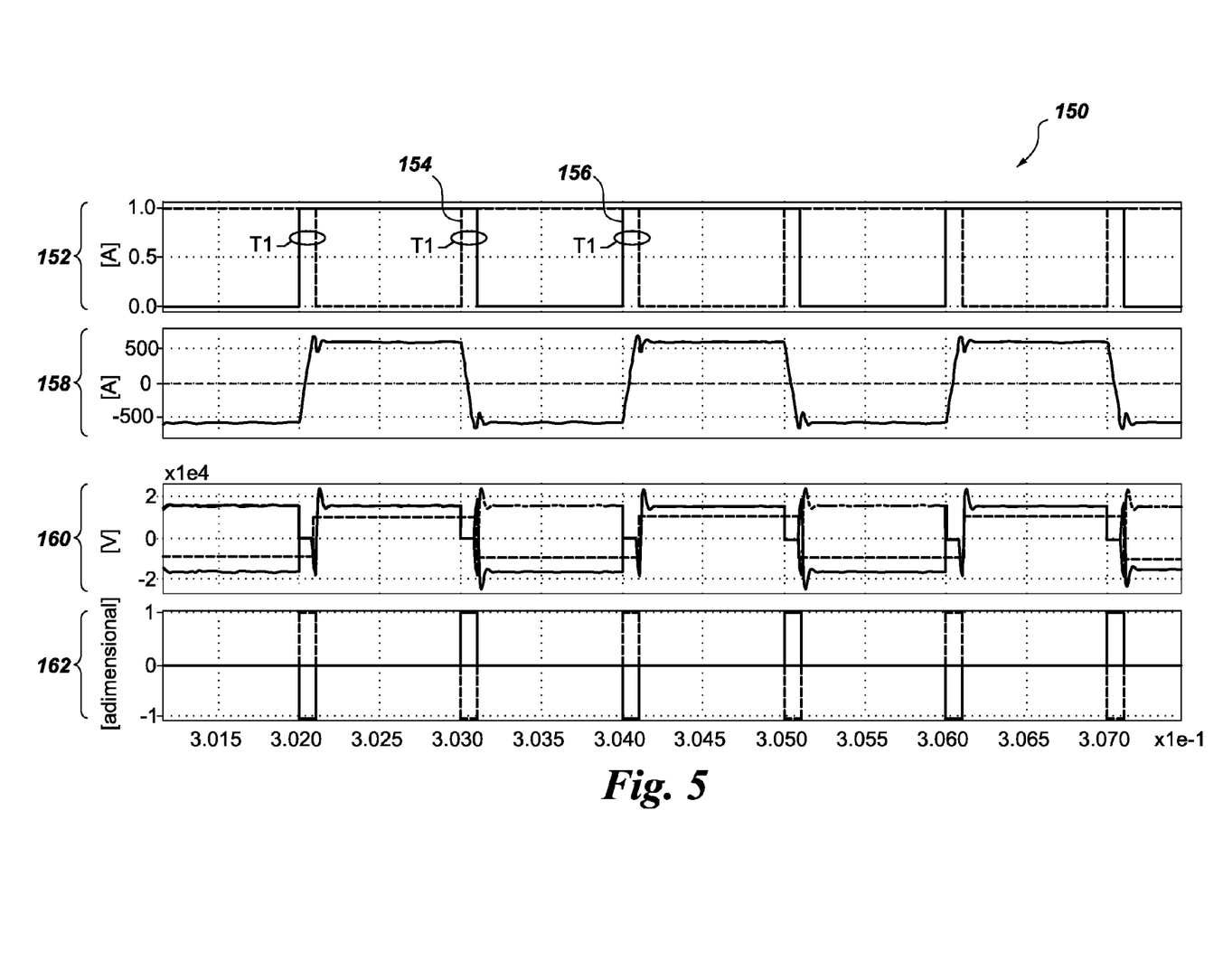
FIG. 5 is a graphical diagram illustrating simulation plots of the subsea power transmission/distribution system of FIG. 2 in accordance with an embodiment of the present technique.

Referring now to FIG. 5, a graphical diagram 150 illustrating simulation plots of the subsea power transmission/distribution system of FIG. 2 in accordance with an embodiment of the present technique is depicted. In FIG. 4, plot 152 represents a switching signal 154 for switching devices 102, 108 and a switching signal 156 for switching devices 104, 106 respectively. As can be seen from plot 152, during time period T1 both switching signals 154 and 156 are high and thus, all switching devices are switched ON. This period represents short circuit duration of the transformer winding as discussed earlier.

Furthermore, plot 158 shows a current in the primary winding of the transformer. As can be seen the current is a trapezoidal waveform. In general, the waveform is mostly square but during time period T1, it has some slope. During this time, the current flowing in the primary winding can change its direction.

Plot 160 shows a voltage across the switching device in presence of a snubber circuit. As can be seen the voltage spikes are not very high and further if switching timings are optimized then the voltage spikes may reduce even further. Plot 162 shows intervals during which the active rectifier is in operation. As can be seen these durations coincide with time period T1 and active rectification during this time period assists in current reversal in the transformer winding.

One of the advantages of the present system is high system availability via a more fault tolerant conversion structure based on a current source, medium frequency, concept that minimizes components, eliminates large capacitors in the subsea part of the converter. Another advantage of the system is that it increases the utilization of the transformer material.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power transmission and distribution system comprising:
    a supplying side including a current source;
    a receiving side comprising:
        a modular converter with a plurality of direct current (DC)-alternating current (AC) current source converters connected in series with the current source;
        a plurality of AC-DC rectifiers connected in parallel to supply power to a multiplicity of loads, wherein each of the DC-AC current source converters supply power to a corresponding AC-DC rectifier and includes a plurality of reverse blocking fully controllable switches having bidirectional voltage blocking capability; and
        wherein a current from the current source flows in at least one reverse blocking fully controllable switches at any instant.

2. The power transmission and distribution system of claim 1, wherein the current flows in more than six reverse blocking fully controllable switches at any instant.

3. The power transmission and distribution system of claim 1, wherein at least one of the DC-AC current source converters does not possess an electrical network connected between its two DC terminals that comprises only a plurality of capacitors.

4. The power transmission and distribution system of claim 1, wherein at least one of the DC-AC current source converters includes an electrical network connected between its two DC terminals that comprise a plurality of capacitors and a plurality of other electric elements.

5. The power transmission and distribution system of claim 1, wherein each of the DC-AC current source converters is coupled to the corresponding AC-DC rectifier via a transformer.

6. The power transmission and distribution system of claim 5, wherein at least one reverse blocking fully controllable switch is operated according to a sign of at least one current in at least one transformer winding.

7. The power transmission and distribution system of claim 5, wherein each of the plurality of AC-DC rectifiers include an active rectifier comprising fully controllable switches or a passive rectifier including diodes.

8. The power transmission and distribution system of claim 7, further comprising an active rectifier each connected to a tertiary winding of the transformer if the plurality of AC-DC rectifiers include passive rectifiers.

9. The power transmission and distribution system of claim 1, wherein the plurality of DC-AC current source converters include multiphase DC-AC current source converters and the plurality of AC-DC rectifiers include AC-DC multiphase rectifiers.

10. The power transmission and distribution system of claim 1, wherein the current source includes an AC-DC converter followed by a DC-DC converter.

11. The power transmission and distribution system of claim 1, wherein the plurality of reverse blocking full controllable switches include insulated gate bipolar transistors (IGBTs) in series with diodes, reverse blocking insulated gate bipolar transistors (IGBTs) or reverse blocking integrated gate commutated thyristor (IGCTs).

12. The power transmission and distribution system of claim 1, wherein the plurality of reverse blocking full controllable switches include wide band-gap switching devices.

13. The power transmission and distribution system of claim 1, wherein each of the DC-AC current source converters include at least two phase legs each comprising the plurality of reverse blocking fully controllable switches.

14. The power transmission and distribution system of claim 13, wherein the AC-DC current source converter is operated in a square wave operation, with pairs of reverse blocking fully controllable switches not belonging to a same leg, and not connected to a common point, are commanded almost simultaneously.

15. A method of transmitting power to a subsea load comprising:
    providing a plurality of reverse blocking fully controllable switches having bidirectional voltage blocking capability to form a modular converter with a plurality of direct current (DC)-alternating current (AC) current source converters;
    connecting the plurality of DC-AC current source converters in series with a supply side current source;

supplying AC power to a plurality of AC-DC rectifiers from the plurality of DC-AC current source converters, wherein supplying AC power includes coupling each of the DC-AC current source converters to a corresponding AC-DC rectifier; wherein a current from the supply side current source flows in at least one reverse blocking fully controllable switch at any instant; and coupling the plurality of AC-DC rectifiers in parallel to supply power to the subsea load.

16. The method of claim 15, wherein coupling each of the DC-AC current source converters to a corresponding AC-DC rectifier comprises a coupling via a transformer.

17. The method of claim 16, wherein supplying AC power to a plurality of AC-DC rectifiers include operating at least one reverse blocking fully controllable switch according to a sign of at least one current in at least one transformer winding.

18. The method of claim 15, wherein providing the plurality of reverse blocking fully controllable switches include providing one of insulated gate bipolar transistors (IGBTs) in series with diodes, reverse blocking insulated gate bipolar transistors (IGBTs) or reverse blocking integrated gate commutated thyristor (IGCTs).

19. The method of claim 15, wherein forming each of the DC-AC current source converters include at least two legs each comprising the plurality of reverse blocking fully controllable switches.

20. The method of claim 19, wherein supplying AC power to a plurality of AC-DC rectifiers from the plurality of DC-AC current source converters include operating the AC-DC current source converters in a square wave operation, with pairs of reverse blocking fully controllable switches not belonging to a same leg, and not connected to a common point being commanded almost simultaneously.

21. The method of claim 15, further comprising providing a plurality of active rectifiers when the plurality of AC-DC rectifiers comprises a plurality of passive rectifier.

* * * * *